Oct. 30, 1962  H. WEILL ET AL  3,061,778
DEVICE FOR MEASURING THE Q-FACTOR OF RESONANT CAVITIES
Filed Sept. 23, 1959
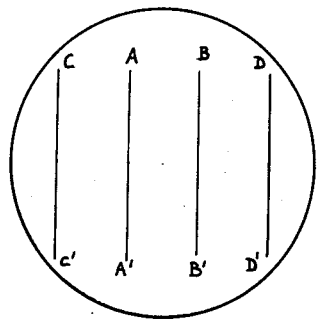
Fig:1
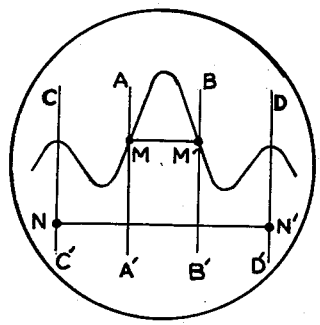
Fig:2
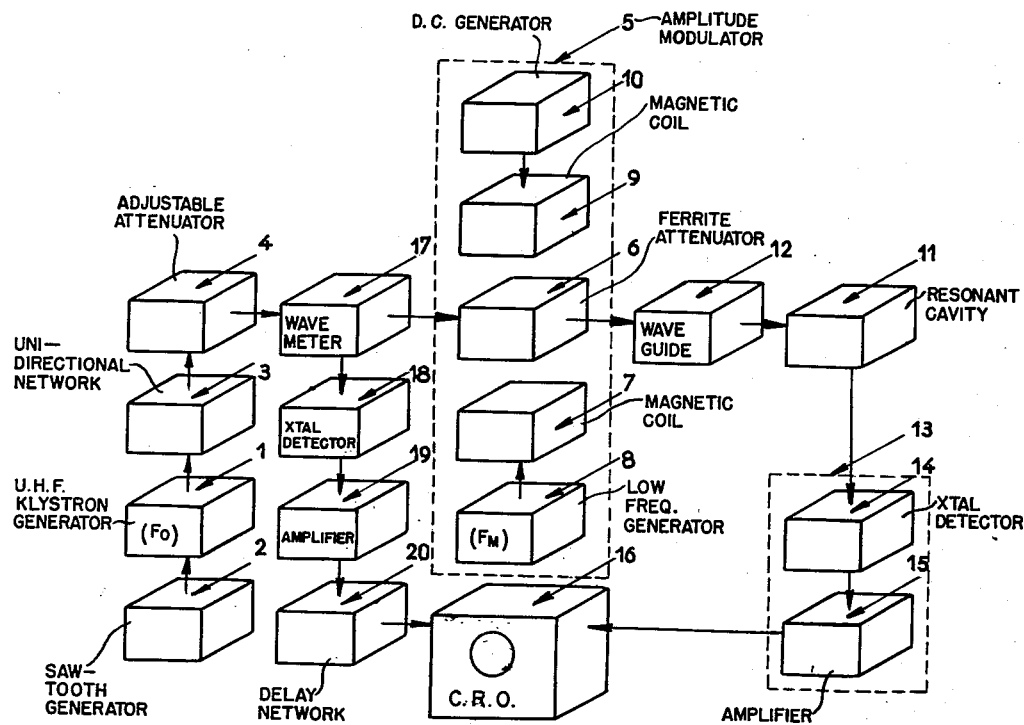
Fig:3
INVENTORS
HENRY WEILL
PAUL BOUTELANT
BY Paul M. Craig, Jr.
ATTORNEY

3,061,778
DEVICE FOR MEASURING THE Q-FACTOR OF RESONANT CAVITIES

Henry Weill and Paul Bouteiant, Paris, France, assignors to Compagnie Generale d'Electricite, Paris, France, a French corporation
Filed Sept. 23, 1959, Ser. No. 841,764
Claims priority, application France Sept. 26, 1958
10 Claims. (Cl. 324—58)

The object of the present invention is a device making it possible to measure the high value factors of resonant cavities used as oscillatory circuits in the art of hyperfrequency waves.

A certain number of devices of this type are known, and are described in particular in the paper "Microwave measurements" volume No. 11 of the collection of the Massachusetts Institute of Technology (R.L.S.) pages 392–407. However, all these known devices have drawbacks which render it difficult to use them for measuring Q factors of very high values: in particular they need voltage generators with a very high rate of frequency stability, and require very great accuracy in the measurement of very small frequency deviations.

The device according to the present invention which does not have these drawbacks, is characterized in this, that it comprises a generator providing a hyperfrequency wave of frequency $f_0$ equal to the frequency of resonance of the cavity of which the Q factor is to be measured, a first modulator, controlled by a sawtooth wave, to frequency-modulate said hyperfrequency wave, a second modulator, controlled by a low frequency generator to amplitude-modulate said frequency-modulated hyperfrequency wave, means to apply the wave thus doubly modulated to the input of the resonant cavity, means to detect the wave at the output of said resonant cavity and an oscilloscope, to which the wave so detected is applied to the horizontal deflection means, and of which the vertical deflection means is controlled by the sawtooth wave, so that there appears on its screen a principal lobe for the frequency of resonance of the cavity and two symmetrical secondary lobes, the frequency of the voltage supplied by the low frequency generator being regulated to such a value $f_m$ that the distance between the tops of the two secondary lobes is equal to three times the width of the principal lobe at mid-ordinate of its peak, the value Q then being given by $$Q = \frac{3f_0}{2f_m}$$

The operation of the device according to the invention will now be explained in more detail with reference, by way of example, to the attached drawings.

It is known that the resonance curve of a cavity, i.e. the curve which gives, as a function of the frequency and for a constant level of excitation, the amplitude of the current supplied by a detector loosely coupled to the output of the cavity, has the following as its equation, in the neighborhood of resonance, in the case of quadratic detection:

$$\frac{i}{i_m} = \frac{1}{1 + 4\frac{(f-f_0)^2}{f_0}Q^2}$$

$i$ being the current detected at the frequency $f$, $i_m$ the maximum current detected at the resonance frequency $f_0$ of the cavity and Q the Q factor of the latter.

In the absence of amplitude modulation, the frequency modulation and the corresponding sweep of the beam of the oscilloscope cause the appearance on the latter of a curve which shows a maximum ordinate for the resonance frequency of the cavity, and a half ordinate for frequencies, symmetrical in relation to said resonance frequency, and separated by a quantity $$\Delta f = \frac{Q}{f_0}$$

If there is superposed on the frequency modulation produced by the saw-tooth wave, an amplitude modulation at the frequency $f_m$, we obtain, for any frequency $f$ comprised within the limits of the frequency modulation, the whole of the frequencies $f$, $f-f_m$, $f+f_m$.

The result, as can be proved by calculation, is that when the frequency and amplitude modulations are effected simultaneously, a curve is obtained upon the oscilloscope which is symmetrical in relation to the resonance frequency of the cavity being tested, while it has a half-ordinate for symmetrical frequencies, separated from each other by $$\Delta f = \frac{Q}{f_0}$$

(the amplitude modulation has practically no effect on the value $\Delta f$), and also secondary maxima for the frequencies $f_0 \pm f_m$.

FIG. 1 shows the screen of the oscilloscope, on which are traced four vertical equidistant lines AA', BB', CC' and DD'. FIG. 2 shows the curve which appears on said screen in the aforementioned conditions.

In order to use the device according to the invention in practice, we begin by adjusting the amplitude of the frequency modulated wave so that the sides of the central lobe of the curve intersect the stright lines AA' and BB' at points MM' of which the ordinate is half the maximum ordinate of said lobe. The Q factor of the resonant cavity is then given by $$Q = \frac{f_0}{\Delta f}$$

$\Delta f$ being a frequency deviation proportional to the distance MM' between the straight lines AA' and BB'. As this deviation is not known a priori, we then operate as follows: The frequency of the voltage causing the amplitude modulation is regulated to such a value $f_m$ that the peaks of the secondary lobes of the curve, due to said modulation, are respectively on the straight lines CC' and DD', in such a way that the distance NN' between these lines is proportional to $2f_m$; now, this distance NN' is equal to 3MM', since the four straight lines AA', BB', CC' and DD' are equidistant. It follows therefore that:

$$\frac{2f_m}{\Delta f} = \frac{NN'}{MM'} = 3$$

hence $$\Delta f = \frac{2}{3}f_m, \text{ and } Q = \frac{3f_0}{2f_m}$$

The measurement of Q is thus brought to the measurement of the frequency $f_0$ and to that of the frequency $f_m$ of the amplitude modulating voltage.

FIG. 3 represents, as a non-limitative example, an embodiment of the device according to the invention.

The hyperfrequency wave is preferably supplied by a reflex klystron 1, and is frequency modulated by applying to one electrode of said klystron a saw-tooth voltage, supplied by a generator 2, comprising, for example, a condenser loaded via a pentode and discharged through a triode. The repetition rate of the saw-tooth waves can be adjusted by a multivibrator between 50 and 300 c./s. and their amplitude can be adjusted to any value between 2 and 4 volts by means of a voltage divider.

The wave so frequency modulated is applied, via a unidirectional network 3, and adjustable attenuator 4 and a wave meter 17, to an amplitude modulator 5.

The latter may consist of a ferrite attenuator 6, subjected, on the one hand, to the action of a variable magnetic field generated in a coil 7, by a sinusoidal current, of frequency $f_m$ comprised between 10 and 600 kc./s., supplied by a generator 8, and on the other hand, to the action of a fixed field, created either by a magnet or by another coil 9 fed by a source of direct current 10. Such a modulator makes it possible to obtain a rate of modulation of 70% and an attenuation greater than 15db, so that the side lobes of the curve which appears on the screen of the oscilloscope are clearly separated from the principal lobe.

The resonant cavity 11, of which the Q factor is to be measured, is connected to the output of the modulator 5 by means of a wave-guide 12.

If the Q factor of said cavity, for example, is one million, the width $MM' = \Delta_f$, for an ordinate which is half the maximum ordinate of the principal lobe, will, for a frequency $f_0 = 35,000$ mc./s., be equal to 35 kc./s.; the frequency of the amplitude modulating voltage must therefore be adjusted to a value $$f_m = \frac{3}{2} \times \Delta f = 52.5 \text{ kc./s}$$

The low frequency generator 8 which supplies this voltage of frequency $f_m$ can be directly graduated in terms of the Q factor.

The voltage coming from the cavity 11 is applied to a receiver 13, comprising a crystal detector 14 and an amplifier 15 giving an approximate gain of 70db in a band from 300 to 1,200,000 c./s.; the output of this receiver is connected to the horizontal deflection plates of a cathode ray oscilloscope 16, of which the vertical deflection plates are controlled by the saw-tooth voltage supplied by the generator 2 and preferably obtained through a detector circuit, described hereinafter, from the frequency modulated wave at the wave meter 17. Although the vertical plates of the oscilloscope could be connected directly to the saw-tooth tube, the illustrated connection achieves wave forms of the same base frequency at the outputs of the detectors 18 and 14, respectively, and, accordingly, at the respective deflecting plates of the oscilloscope, thus assuring greater stability to the curve appearing on the oscilloscope screen.

The wave-meter 17, connected to the output of the attenuator 4, and which makes it possible to measure the frequency $f_0$ of the frequency modulated hyperfrequency signal, comprises, in addition to the output connected to the amplitude modulator 5, a second output, connected via a crystal detector 18, an amplifier 19 and if necessary a delay network 20, to the vertical plates of the oscilloscope 16.

What is claimed is:

1. A device for measuring the Q factor of a resonant cavity, comprising circuit means for producing a frequency-modulated hyperfrequency wave including first generator means supplying a hyperfrequency wave of frequency $f_0$ equal to the frequency of resonance of said cavity and first modulator means including a saw-tooth wave generator operatively connected to said first generator means to frequency modulate said hyperfrequency wave, second modulator means including adjustable low frequency generator means operatively connected to said circuit means to amplitude modulate said frequency-modulated hyperfrequency wave, coupling means to apply the waves so doubly modulated to an input of the resonant cavity, detector means connected to an output of said resonant cavity for detecting a wave received therefrom, oscilloscope means having a screen and two deflection means for controlling a signal trace on said screen with respect to different coordinates, means for connecting said detecting means to one of said two deflection means, and means operatively connecting said saw tooth wave generator to the other deflection means of said oscilloscope in such a way that there appears on the oscilloscope screen a curve showing a principal lobe for the frequency of resonance of the cavity and two secondary symmetrical lobes, the frequency of the low frequency generator being adjusted to such a value $f_m$ that the distance between the tops of the secondary lobes is equal to three times the width of the principal lobe at mid-ordinate of its peak, the value Q then being given by $$Q = \frac{3f_0}{2f_m}$$

2. A device for measuring the Q factor of a resonant cavity comprising first generator means supplying a wave of frequency $f_0$ equal to the frequency of resonance of said cavity, saw tooth wave generator means operatively connected to said first-mentioned generator means for frequency modulating the wave of frequency $f_0$, amplitude modulator means including a low-frequency generator supplying an adjustable modulating frequency $f_m$ and operatively connected to an output of said first-mentioned generator means to amplitude modulate the frequency modulated wave therefrom, means for coupling the amplitude modulated wave from said amplitude modulator means to an input of the resonant cavity, receiver means coupled to said cavity and including detector means for detecting a wave from said cavity, cathode ray oscilloscope means having two deflection means for deflecting the cathode ray along perpendicular coordinates, means for coupling one of said deflection means to said receiver means for controlling deflection of the ray by the detected wave, and circuit means operatively connected to said saw tooth wave generator and said oscilloscope means for controlling the other deflection means in such a way that there appears on the oscilloscope screen a curve showing a principal lobe for the frequency of resonance of the cavity and two secondary symmetrical lobes, the frequency of the low frequency generator being adjusted to such a value $f_m$ that the distance between the tops of the secondary lobes is equal to three times the width of the principal lobe at mid-ordinate of its peak, the value Q then being given by $$Q = \frac{3f_0}{2f_m}$$

3. A device according to claim 2 including a wave meter between said first-mentioned generator means and said amplitude modulator means for measuring the frequency $f_0$.

4. A device according to claim 3, wherein said amplitude modulator means includes a ferrite attenuator and means for subjecting said ferrite attenuator to a varying magnetic field controlled by said low frequency generator means.

5. A device for measuring the Q-factor of a resonant cavity, comprising first generator means supplying a wave of frequency $f_0$ equal to the frequency of resonance of said cavity, saw-tooth wave generator means operatively connected to said first-mentioned generator means for frequency modulating the wave of frequency $f_0$, a wave-meter operatively connected to said first generator means, amplitude modulator means including a low-frequency generator supplying an adjustable modulating frequency $f_m$ and operatively connected to an output of said wave-meter to amplitude-modulate said frequency-modulated wave, said amplitude modulator means including a ferrite attenuator and means for subjecting said ferrite attenuator to a varying magnetic field controlled by said low frequency generator means, means for coupling the amplitude-modulated wave from said amplitude-modulated means to an input of the resonant cavity, receiver means coupled to said cavity and including detector means for detecting a wave from said cavity, cathode ray oscilloscope means having two deflection means for deflecting the cathode ray along perpendicular coordinates, means for coupling one of said deflection means to said receiver means for controlling deflection of the ray by the detected wave, and circuit means including second detector means operatively connected to said wave-meter to detect the frequency-modulated wave and a delay network in series therewith for controlling the other deflection means in such a way that there appears on the oscilloscope screen a curve showing a principal lobe for the frequency of resonance of the cavity and two secondary symmetrical lobes, the frequency of the low frequency generator being adjusted to such a value $f_m$ that the distance between the tops of the secondary lobes is equal to three times the width of the principal lobe at mid-ordinate of its peak, the value Q then being given by $$Q = \frac{3f_0}{2f_m}$$

6. A device according to claim 5, wherein said first generator means includes a klystron producing the wave of frequency $f_0$, and including a unidirectional network connected between said first generator means and said wave meter.

7. A device according to claim 6, wherein each detector means includes a crystal detector and an amplifier means for amplifying a detected wave.

8. A device according to claim 7, wherein a wave guide is connected to couple said amplitude modulator to said resonant cavity.

9. A device for measuring the Q factor of a resonant cavity, comprising first generator means for supplying a wave of frequency $f_0$ equal to the frequency of resonance of said cavity, saw-tooth wave generator means operatively connected to said-first mentioned generator means for frequency modulating the wave of frequency $f_0$, amplitude modulator means including low-frequency generator means supplying an adjustable modulating frequency $f_m$ and operatively connected to an output of said first-mentioned generator means to amplitude modulate the frequency-modulated wave therefrom, means for coupling the amplitude modulated wave from said amplitude modulator means to an input of the resonant cavity, receiver means coupled to said cavity and including detector means for detecting a wave from said cavity, cathode ray oscilloscope means having two deflection means for deflecting the cathode ray along perpendicular coordinates, means for coupling one of said deflection means to said receiver means for controlling deflection of the ray by the detected wave, and circuit means comprising second detector means operatively connected to said amplitude-modulator means to detect the frequency-modulated wave and to provide a deflection controlling signal for controlling the other deflection means in such a way that there appears on the oscilloscope screen a curve showing a principal lobe for the frequency of resonance of the cavity and two secondary symmetrical lobes, the frequency of the low frequency generator being adjusted to such a value $f_m$ that the distance between the tops of the secondary lobes is equal to three times the width of the principal lobe at mid-ordinate of its peak, the value Q then being given by $$Q = \frac{3f_0}{2f_m}$$

10. A device for measuring the Q factor of a resonant cavity, comprising first generator means for supplying a wave of frequency $f_0$ equal to the frequency of resonance of said cavity, saw-tooth wave generator means operatively connected to said first-mentioned generator means for frequency modulating the wave of frequency $f_0$, attenuator means for controlling the amplitude of said frequency-modulated wave, wavemeter means connected to said attenuator means, amplitude modulator means including a low frequency generator supplying an adjustable modulating frequency $f_m$ and operatively connected to an output of said wave-meter means to amplitude-modulate said frequency modulated waves, means for coupling the amplitude modulated wave from said amplitude modulator means to an input of the resonant cavity, detector means for detecting a wave from said cavity, cathode ray oscilloscope means having two deflection means for deflecting the cathode ray along perpendicular coordinates, means for coupling one of said deflection means to said detection means for controlling deflection of the ray by the detected wave, and circuit means including second detector means connected to said wavemeter means to detect the frequency-modulator wave and provide a deflection controlling signal for controlling the other deflection means in such a way that there appears on the oscilloscope screen a curve showing a principal lobe for the frequency of resonance of the cavity and two secondary symmetrical lobes, the frequency of the low frequency generator being adjusted to such a value $fm$ that the distance between the tops of the secondary lobes is equal to three times the width of the principal lobe at mid-ordinate of its peak, the value Q then being given by $$Q = \frac{3f_0}{2f_m}$$

References Cited in the file of this patent

UNITED STATES PATENTS

| | | |
|---|---|---|
| 2,475,179 | Eltgroth | July 5, 1949 |
| 2,682,033 | Smullin | June 22, 1954 |

OTHER REFERENCES

Sproull et al.: "Resonant-Cavity Measurements," Proceedings of the I.R.E. and Waves and Electrons, May, 1946; pages 305–312.

Sterling et al.: "Receiver Bandwith and Its Measurement," Audio Engineering, January 1951; pages 18, 19, 46 and 47.